United States Patent
Neill et al.

[11] Patent Number: 5,881,770
[45] Date of Patent: Mar. 16, 1999

[54] SWITCHING VALVE

[75] Inventors: John H. Neill, Edgewater; Sergio Radossi, Cresskill, both of N.J.

[73] Assignee: Hoke Incorporated, Cresskill, N.J.

[21] Appl. No.: 917,524

[22] Filed: Aug. 26, 1997

[51] Int. Cl.$^6$ .................................................. E03B 31/00
[52] U.S. Cl. ............................... 137/625.11; 137/625.46; 251/297
[58] Field of Search .................... 137/625.11, 625.46; 251/304, 297

[56] References Cited

U.S. PATENT DOCUMENTS

| | | |
|---|---|---|
| 1,784,381 | 12/1930 | O'Stroske . |
| 2,075,458 | 3/1937 | Parker ................................. 137/625.11 |
| 2,091,874 | 8/1937 | Neuhaus . |
| 2,492,140 | 12/1949 | Fike et al. .......................... 137/625.11 |
| 2,700,984 | 2/1955 | Gleasman .......................... 137/625.11 |
| 2,885,179 | 5/1959 | Hartmann . |
| 2,893,430 | 7/1959 | Holl . |
| 2,974,681 | 3/1961 | Whitehurst ........................ 137/625.11 |
| 2,979,963 | 4/1961 | Snoy ................................... 137/625.11 |
| 3,056,426 | 10/1962 | Hauser ................................ 137/625.11 |
| 3,236,495 | 2/1966 | Buchholz . |
| 3,554,224 | 1/1971 | Kirk et al. . |
| 3,633,621 | 1/1972 | Myers ................................. 137/625.11 |
| 3,687,163 | 8/1972 | Nickels . |
| 3,735,956 | 5/1973 | Matousek . |
| 3,837,360 | 9/1974 | Bubula ............................... 137/625.11 |
| 4,294,285 | 10/1981 | Joslyn ................................ 137/625.11 |
| 4,410,001 | 10/1983 | Goguen . |
| 4,441,524 | 4/1984 | Mese . |
| 4,538,640 | 9/1985 | Acker ................................. 137/625.11 |
| 4,632,148 | 12/1986 | Stark, Sr. et al. ................. 137/625.11 |
| 4,632,149 | 12/1986 | Oroskar et al. ................... 137/625.11 |
| 5,261,451 | 11/1993 | Spencer . |
| 5,520,216 | 5/1996 | d'Agostino et al. . |
| 5,613,511 | 3/1997 | Anderson et al. . |

*Primary Examiner*—Denise L. Ferensic
*Assistant Examiner*—John Ball

[57] ABSTRACT

A switching valve having a bottom plate, an intermediate plate and a top plate. A distributor rotatably mounted in the intermediate plate. The bottom plate has an upper surface, and the distributor has a lower surface which interface with each other. The bottom plate has an inlet and an outlet spaced from each other and each having an inlet conduit extending from the inlet to the upper surface of the bottom plate and an outlet conduit extending from the outlet to the upper surface of the bottom plate. The distributor having an inlet conduit, an outlet conduit and a connecting conduit connecting the two together. The distributor inlet conduit is in communication with the bottom plate inlet conduit. The distributor outlet conduit is spaced from the distributor inlet conduit a distance equal to the space between the bottom plate outlet conduit and bottom plate inlet conduit so that rotation of the distributor to a predetermined position places the distributor outlet conduit in alignment with the bottom plate outlet conduit to permit fluid to flow from the inlet to the outlet and rotation of the distributor to another position disconnects the distributor outlet conduit from the bottom outlet conduit plate to prevent flow of the fluid. An O-ring seal in the bottom plate on each side of the bottom plate outlet conduit. An O-ring seal is provided in the top and bottom surfaces of the intermediate plate.

14 Claims, 3 Drawing Sheets

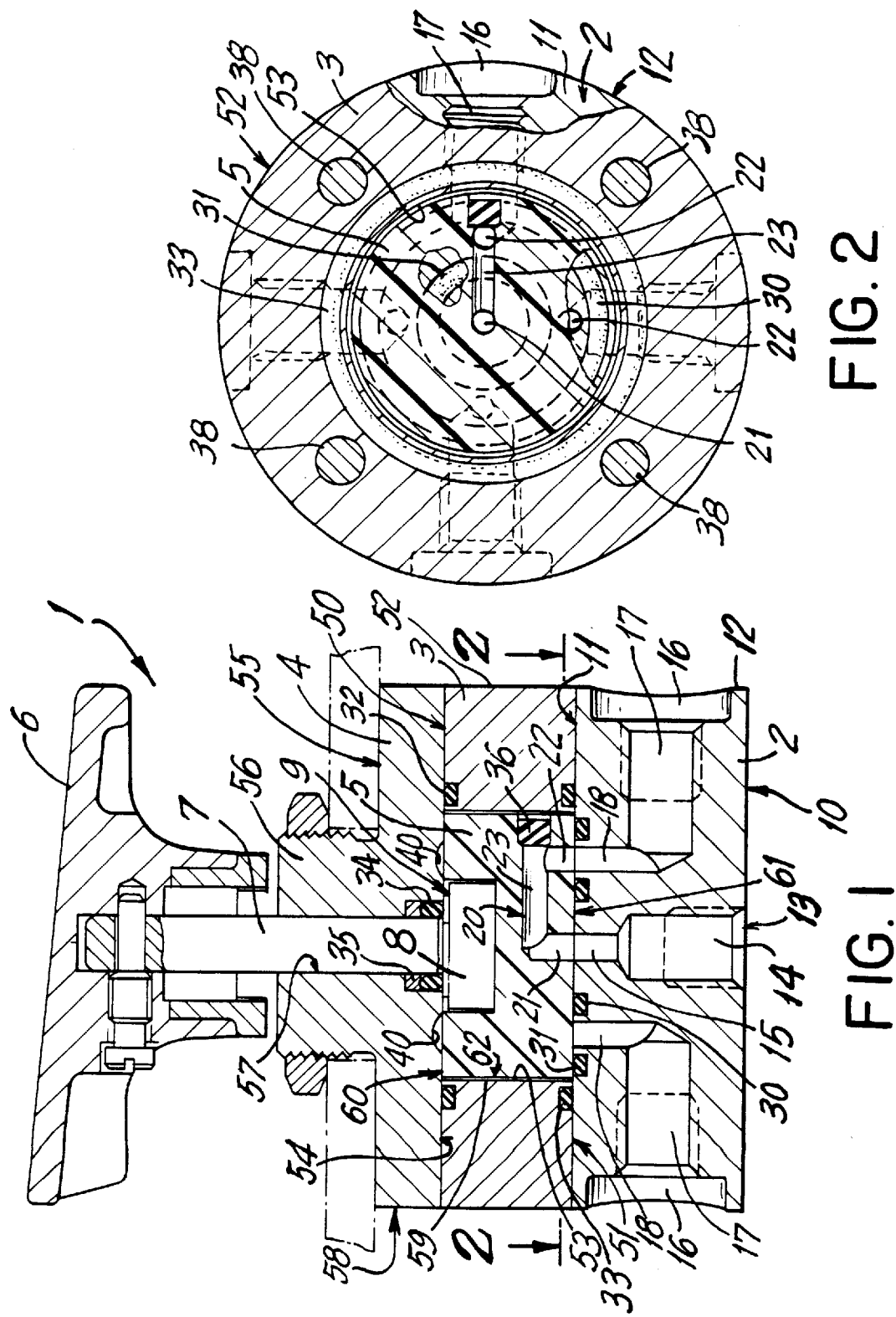

SWITCHING VALVE

BACKGROUND

The present invention relates to a switching valve and more particularly to an improved switching valve which alternately connects and disconnects a inlet source to a plurality of outlets.

Heretofore such switching valves have been in use for alternately connecting an inlet seriatim to a plurality of outlets and disconnecting the inlet seriatim from a plurality of outlets. However, some of such valves leak and require elaborate and expensive sealing mechanisms which are difficult to operate to make them leak proof.

OBJECTS

The present invention avoids these drawbacks and has for one of its objects the provision of an improved switching valve which will connect and disconnect an inlet to a plurality of outlets.

Another object of the present invention is the provision of an improved switching valve in which the valve is tightly sealed to prevent leakage.

Another object of the present invention is the provision of an improved switching valve which is easy to operate.

Another object of the present invention of an improved switching valve which is easy and inexpensive to manufacture and maintain.

Other and further objects of the invention will be obvious upon an understanding of the illustrative embodiment about to be described, or will be indicated in the appended claims and various advantages not referred to herein will occur to one skilled in the art upon employment of the invention in practice.

DRAWINGS

A preferred embodiment of the invention has been chosen for purposes of illustration and description and is shown in the accompanying drawings forming a part of the specification wherein:

FIG. 1 is a sectional side view of a switching valve made in accordance with the present invention.

FIG. 2 is a sectional view taken along line 2—2 of FIG. 1.

DESCRIPTION

Figure 3:
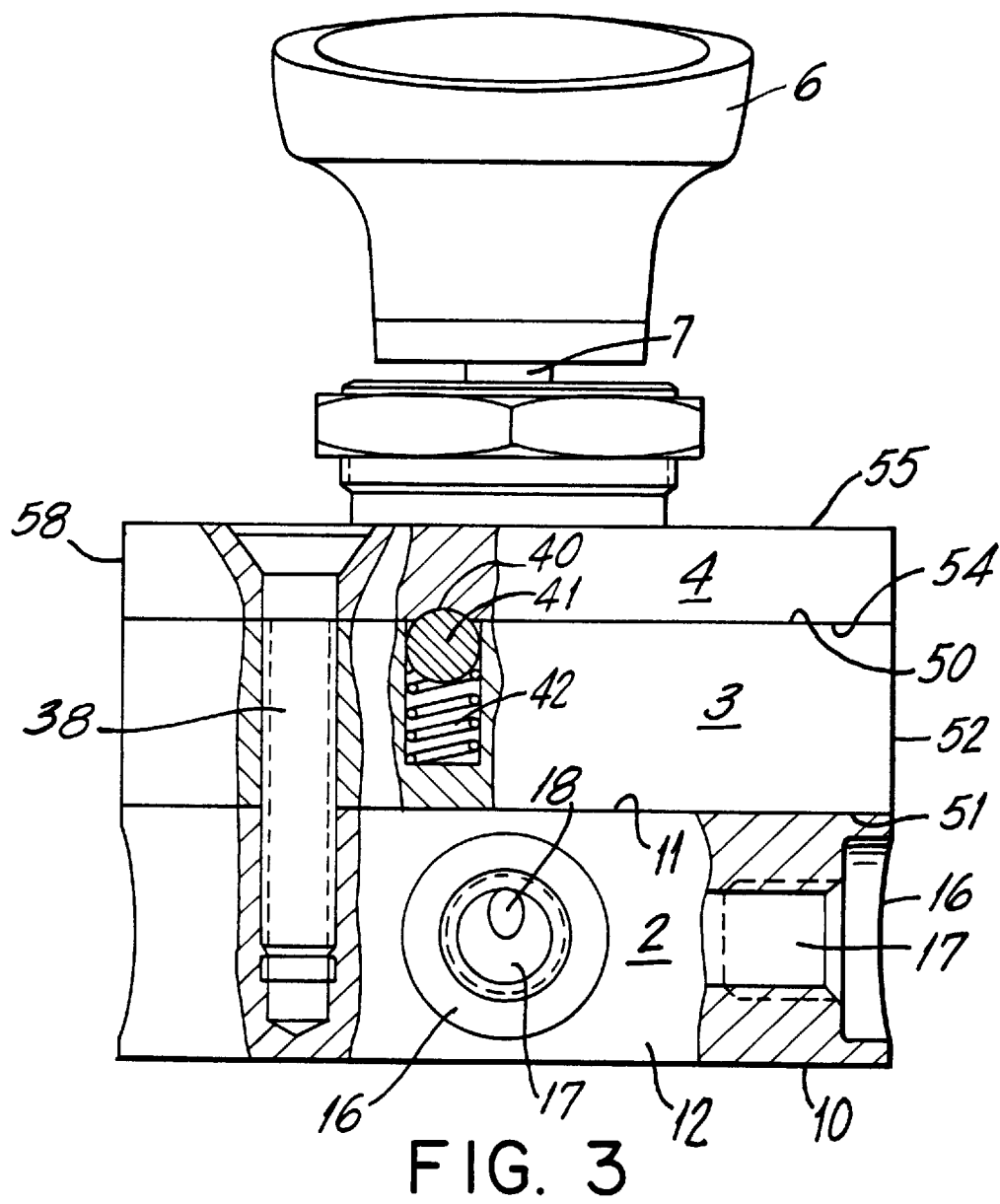
FIG. 3 is a side elevational view, partly in section, of the switching valve.

Referring to FIGS. 1–3, the switching valve 1 of the present invention comprises a circular bottom plate 2, an intermediate plate 3 and a top plate 4. The bottom plate 2 has a bottom surface 10, a top surface 11, and a circular outer peripheral edge 12. However, it will be understood that it is within the purview of the present invention for the shape of the outer peripheral edge 12 to be of a configuration other than circular. The intermediate plate 3 has an upper surface 50, a lower surface 51, a circular outer peripheral edge 52 and a central interior circular opening 53 having a peripheral wall 59. It will be understood that the outer peripheral edge 52 may have a configuration other than circular without departing from the invention. The upper plate 4 has a lower surface 54, an upper surface 55 having an upstanding central attachmnent post 56 with a central shaft receiving opening 57 therein, and a circular outer peripheral edge 58. The configuration of the outer peripheral edge 58 may be other than circular if desired. Mounted within the central interior circular opening 53 in the intermediate plate 3 is a rotatable circular distributor 5 having an upper surface 60 interfacing with lower surface 54 of upper plate 4 and a lower surface 61 interfacing with upper surface 51 of lower plate 2. The distributor 5 has an outer circular peripheral edge which interfaces with peripheral wall 59 of opening 53 in intermediate plate 3. The distributor 5 is rotated by a knob 6 through the intermediation of a shaft 7 extending through the opening 57 and keyed to the distributor 5 by key and slot assembly 8–9 in upper surface 60 of the distributor 5. The three plates 2,3,4 are attached to each other and held together by bolts 8 or any other well-known fastening means.

The lower surface wall 10 of the bottom plate 2 has an inlet opening 13 which is centrally located and which communicates with a centrally located inlet socket 14 which in turn communicates with a centrally located inlet conduit 15 extending upwardly to the upper surface 11 of bottom plate 2. Along the outer peripheral edge 12 of the bottom plate 2 are a plurality of spaced outlets 16 each of which communicates with an outlet socket 17 which is oriented substantially parallel to the upper and lower surfaces 11–10 of the bottom plate 2 and substantially midway thereof. Each of the outlet sockets 17 communicates with an outlet conduit 18 of a smaller diameter which extends upwardly, preferably at right angles to the outlet conduits 18 to the upper surface 11 of the bottom plate 2. In the embodiment shown in FIGS. 1, 2 and 3 four such outlet assemblies (comprising outlet 16, outlet socket 17 and outlet conduit 18) are shown in evenly spaced relationship to each other around the periphery of the outer peripheral edge 12 of bottom plate 2.

It will be understood that the identification of openings 13 and 16 and related sockets and conduits as inlets and outlets respectively hereinabove and hereinafter is for ease of description only. The openings 13 and 16 with related sockets and conduits may be outlets and inlets, respectively, without departing from the invention.

The rotatable distributor 5 has a conduit assembly 20 which comprises vertical inlet conduit 21 and vertical outlet conduit 22 connected together by a horizontal connecting conduit 23. The vertical inlet conduit 20 is at the center of the distributor 5 and communicates with and is axially aligned with the upwardly extending centrally located inlet conduit 15 in the bottom plate 2. The vertical outlet conduit 22 is spaced from vertical inlet conduit 21 at the same distance as the distance between the inlet conduit 15 and outlet 18 in the bottom plate 2, so that when the distributor 2 is in the proper position, the vertical outlet conduit 22 in the distributor 5 will communicate with the outlet conduit 18 in the bottom plate 2 and the vertical inlet conduit 21 in distributor 5 communications with inlet conduit 15 in bottom plate 2 to complete a path between inlet 14 and outlet 16 through the intermediation of inlet conduits 15–21, horizontal connecting conduit 23 and outlet conduits 22–18.

It will thus be seen with this construction that when the knob 6 is rotated the conduit assembly 20 in the central distributor 5 moves around. The vertical inlet conduit 21 of the distributor 5 and the inlet conduit 15 in the bottom plate 2 always remain in communication with each other while distributor 5 is being rotated. The vertical outlet conduit 22 of the distributor 5 will be moved into and out of communication of the various outlet conduits 18 in the bottom plate 2. Hence, as the knob 6 is rotated the vertical outlet conduit 22 will be placed in communication with one of the outlet conduits 18 permitting fluid to flow from the inlet 13 to that particular outlet 16. As the distributor 5 is further rotated, the vertical outlet conduit 22 becomes disengaged from and out of communication with the vertical outlet conduit 18 in the bottom plate 2 so that nothing flows. Upon further rotation of the distributor 5 outlet conduit 22 is placed into communication with the next outlet conduit 18 in bottom plate 2 so that flow resumes. Hence, the valve switches from a flow condition to a non-flow condition and by the rotation of the knob 6 the fluid can flow from the inlet 13 through any of the outlets 16 depending on the position of the distributor 5.

The unique seal construction of the valve of the present invention permits rotation of the distributor 5 without any danger of leakage. The upper surface 11 of the bottom plate 2 has a pair of spaced O-rings 30–31 which are located on each side of the outlet conduits 18 in the bottom plate 2. These O-rings 30–31 seal the interface between lower surface 61 of distributor 5 and the upper surface 11 of the bottom plate 2 and seal inlet conduits 15–21 and outlet conduits 22–18 so that no fluid can escape. The central plate 3 has O-rings 32 and 33 on its upper and lower surfaces 54 and 51, respectively, to seal the interface between upper and intermediate plates 4–3 and intermediate and lower plates 2–3, respectively, in order to avoid leakage. An O-ring 34 with associated spacer 35 thereabove is also provided around the shaft 7 adjacent the lower surface 54 of the top plate 4 to avoid leakage. To ease the manufacture of the horizontal connecting conduit 23 in the distributor 5 the horizontal conduit 23 is formed from the outside peripheral edge 62 of the distributor 5 and a seal 36 is mounted therein to plug the horizontal connecting conduit 22 and prevent leakage.

In order to hold the rotatable distributor 5 in a desired position and prevent inadvertent movement thereof, indentations 40 are formed in the lower of the top plate 4 and a spring-pressed lock ball 41 biased by spring 42 is formed in the distributor 5. Thus, when the distributor 5 is rotated to a desired position, the lock-ball 41 will snap into the indentation 40 and prevent further rotation of the distributor 5.

Figure 5:
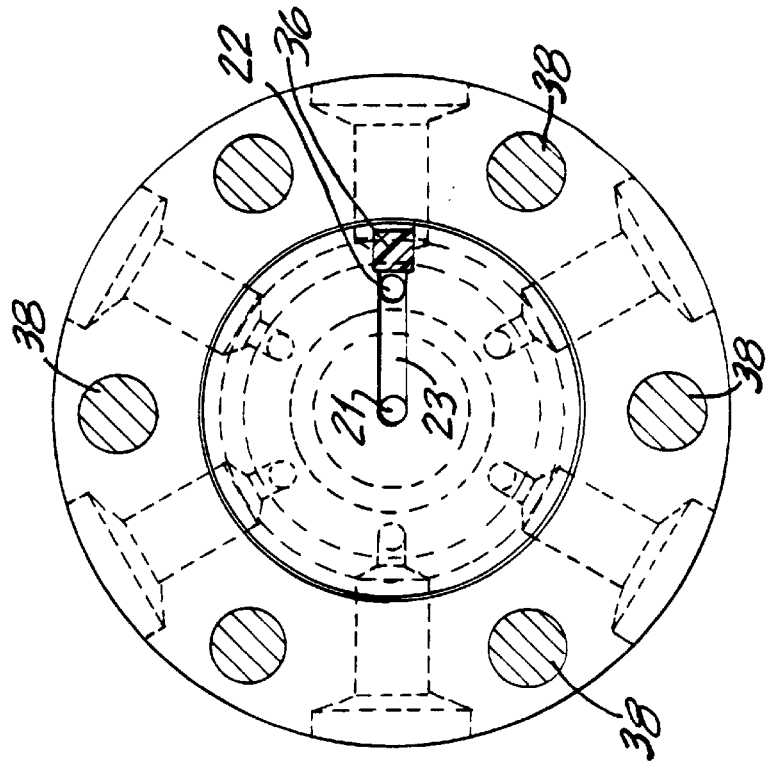
FIG. 5 is a sectional view taken along line 5—5 of FIG. 4.
Figure 4:
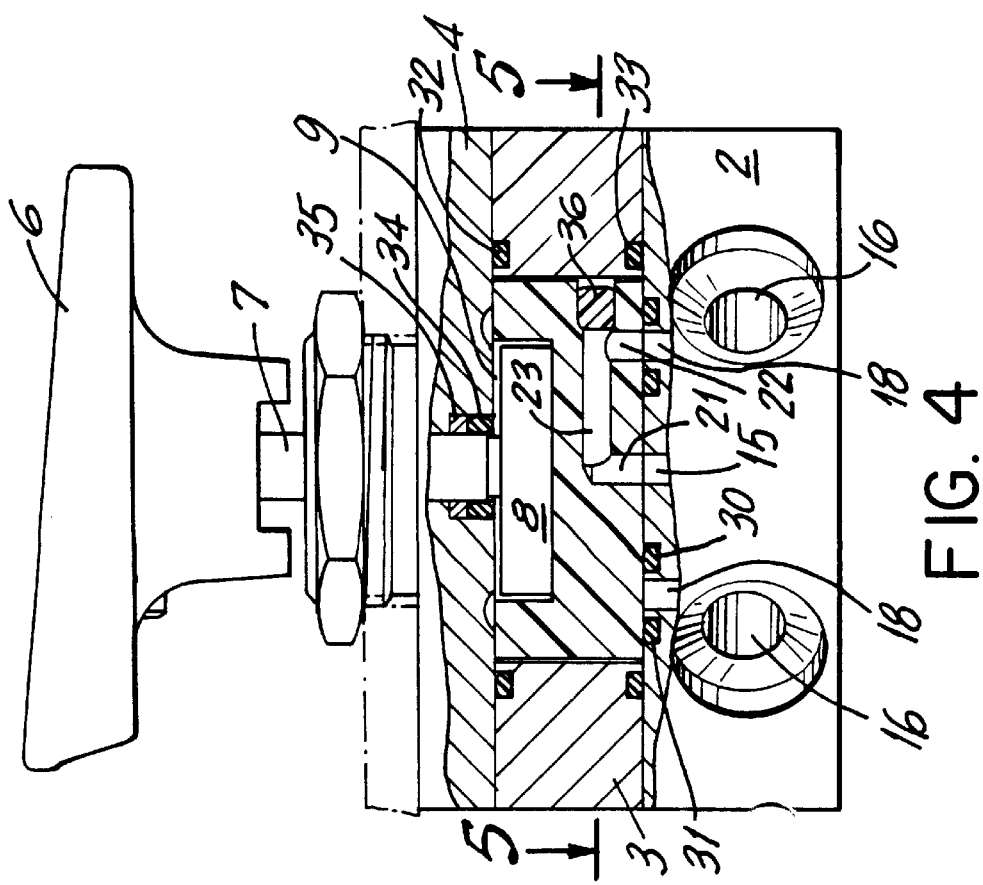
FIG. 4 is a side elevational view, partly in section, showing a modification of the valve of the present invention.

The embodiment in FIGS. 4 and 5 is similar to the embodiment in FIGS. 1 and 3. However, in this embodiment there are six outlets 16 with associated outlet sockets and outlet conduits (rather than the four in FIGS. 1–3 embodiment) so that the distributor 5 may be moved between six positions. Otherwise the construction and operation of the embodiment shown in FIGS. 4 and 5 is similar to the construction and operation of the embodiment shown in FIGS. 1 to 3.

It will thus be seen that the present invention provides an improved switching valve which will connect and disconnect an inlet to a plurality of outlets in which the valve is tightly sealed to prevent leakage, which is easy to operate, and As many and varied modifications of the subject matter of this invention will become apparent to those skilled in the art from the detailed description given hereinabove, it will be understood that the present invention is limited only as provided in the claims appended hereto.

The embodiments of the invention wherein an exclusive property or privilege is claimed is defined as follows:

1. A switching valve comprising a bottom plate, a distributor rotatably mounted on said bottom plate, means for rotating the distributor relative to the bottom plate, said bottom plate having an upper surface, said distributor having a lower surface and an upper surface, the lower surface of said distributor and upper surface of said bottom plate being in an interface relationship with each other, said bottom plate having an inlet and an outlet spaced from each other, a bottom plate inlet conduit extending from the inlet to the upper surface of the bottom plate, a bottom plate outlet conduit extending from the said outlet to the upper surface of the bottom plate, said distributor having an inlet conduit, an outlet conduit and a connecting conduit connecting the two together, said distributor inlet conduit being in communication with the bottom plate inlet conduit, said distributor outlet conduit being spaced from the distributor inlet conduit a distance equal to the space between the bottom plate outlet conduit and the bottom plate inlet conduit whereby rotation of the distributor to a predetermined position places the distributor outlet conduit in alignment with the bottom plate outlet conduit to permit fluid to flow from the inlet to the outlet and whereby rotation of the distributor to another position disconnects the distributor outlet conduit from the bottom outlet conduit plate to prevent such fluid to flow, sealing means in the bottom plate on each side of the bottom plate outlet conduit in order to prevent leakage, an intermediate plate is mounted over the bottom, said distributor being mounted in a central opening in said intermediate plate, said intermediate plate has an upper surface substantially on the same level as the upper surface of the distributor.

2. A switching valve as set forth in claim 1 wherein said sealing means are adjacent the interface between the distributor lower surface and the bottom plate upper surface.

3. A switching valve as set forth in claim 2 wherein sealing means are provided in the intermediate plate at the interface between the lower surface of the intermediate plate and the upper surface of the bottom plate to provide a seal.

4. A switching valve comprising a bottom plate, a distributor rotatably mounted on said bottom plate, means for rotating the distributor relative to the bottom plate, said bottom plate having an upper surface, said distributor having a lower surface, said two surfaces being in an interface relationship with each other, said bottom plate having an inlet and an outlet spaced from each other, a bottom plate inlet conduit extending from the inlet to the upper surface of the bottom plate, a bottom plate outlet conduit extending from the said outlet to the upper surface of the bottom plate, said distributor having an inlet conduit, an outlet conduit and a connecting conduit connecting the two together, said distributor inlet conduit being in communication with the bottom plate inlet conduit, said distributor outlet conduit being spaced from the distributor inlet conduit a distance equal to the space between the bottom plate outlet conduit and the bottom plate inlet conduit whereby rotation of the distributor to a predetermined position places the distributor outlet conduit in alignment with the bottom plate outlet conduit to permit fluid to flow from the inlet to the outlet and whereby rotation of the distributor to another position disconnects the distributor outlet conduit from the bottom outlet conduit plate to prevent such fluid to flow, and sealing means in the bottom plate on each side of the bottom plate outlet conduit in order to prevent leakage, said sealing means are adjacent the interface between the distributor lower surface and the bottom plate upper surface, an intermediate plate is mounted over the bottom plate and the distributor is rotatably mounted in a central opening in said intermediate plate, sealing means are provided in the intermediate plate at the interface between the lower surface of the intermediate plate and the upper surface of the bottom plate to provide a seal, a top plate is mounted over the intermediate plate and the distributor, the top plate having a lower surface which interfaces with the upper surface of the intermediate plate and the upper surface of the rotatable distributor.

5. A switching valve as set forth in claim 4 wherein sealing means are provided in the intermediate plate adjacent the interface of the upper surface of the intermediate plate and the lower surface of the top plate to form a seal.

6. A switching valve as set forth in claim 5 wherein the said sealing means comprise O-rings.

7. A switching valve as set forth in claim 6 wherein said inlet is substantially centrally located in the lower surface of the bottom plate.

8. A switching valve as set forth in claim 7 wherein the bottom plate has a plurality of outlets with a bottom plate outlet conduit extending from and in communication with each, each of said bottom plate outlet conduits extending to the upper surface of the bottom plate.

9. A switching valve as set forth in claim 8 wherein the bottom plate outlet conduit are at right angles to the outlets which they communicate with.

10. A switching valve as set forth in claim 9 wherein the bottom plate inlet conduit is substantially parallel to each of the bottom plate outlet conduits.

11. A switching valve as set forth in claim 10 wherein the distributor inlet and outlet conduits are substantially parallel to each other.

12. A switching valve as set forth in claim 11 wherein the connecting conduit between distributor inlet and outlet conduits is substantially at right angles to both.

13. A switching valve as set forth in claim 12 wherein a plurality of said outlets and associated conduits are provided around the periphery of the bottom plate.

14. A switching valve as set forth in claim 13 wherein inlet and outlet sockets are interposed between and communicate with the inlet and the outlets in the bottom plate and the inlet and outlet conduits in the bottom plate.

* * * * *